United States Patent [19]
Coski

[11] 3,835,933
[45] Sept. 17, 1974

[54] SHIELDING MEANS

[75] Inventor: William D. Coski, Mercer Island, Wash.

[73] Assignee: Ingersoll-Rand Company, Woodcliff Lake, N.J.

[22] Filed: June 27, 1973

[21] Appl. No.: 374,109

[52] U.S. Cl............. 172/518, 172/508, 172/112, 308/187.1, 308/36.5, 277/24
[51] Int. Cl...................... A01b 33/12, F16c 33/76
[58] Field of Search............. 308/36.1, 36.5, 187.1; 277/90, 88, 42, 92, 24; 172/510, 509, 609, 610, 112, 558, 559, 566, 15, 547, 561, 166, 144, 139, 514, 518

[56] References Cited
UNITED STATES PATENTS

| 340,301 | 4/1886 | Feger | 172/166 |
| 400,106 | 3/1889 | Moon | 172/514 |
| 801,153 | 10/1905 | Newton | 308/36.1 |
| 1,316,707 | 9/1919 | Goodrich | 308/36.5 |
| 1,892,465 | 12/1932 | Kegresse | 308/187.1 |
| 3,101,793 | 8/1963 | Brown et al. | 172/610 X |

FOREIGN PATENTS OR APPLICATIONS

| 617,513 | 2/1949 | Great Britain | 308/187.1 |

Primary Examiner—Robert E. Pulfrey
Assistant Examiner—Steven A. Bratlie
Attorney, Agent, or Firm—Bernard J. Murphy

[57] ABSTRACT

The means comprises a flat plate having a mounting limb carried at substantially a right angle, for mounting thereof to a shaft support so that the plate will close upon an axial end of an earth cutter rotatably carried on the shaft. Thus, a clearance space defined between the earth cutter and the shaft is shielded against the entry of dust, rock chips, mud, water and such detritus. The shielding means is designed to prolong the life of bearing seals, and bearings as well, especially where such are in earth cutter use.

15 Claims, 6 Drawing Figures

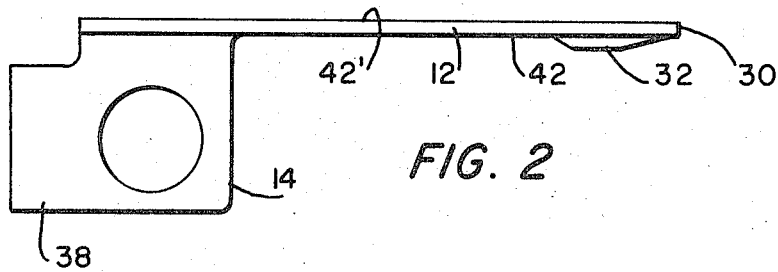
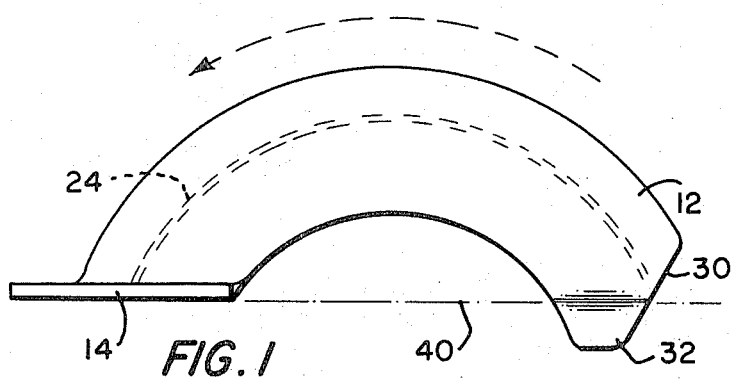
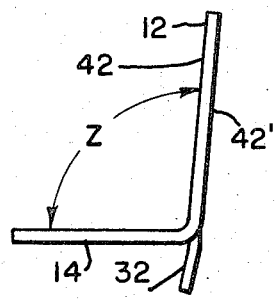
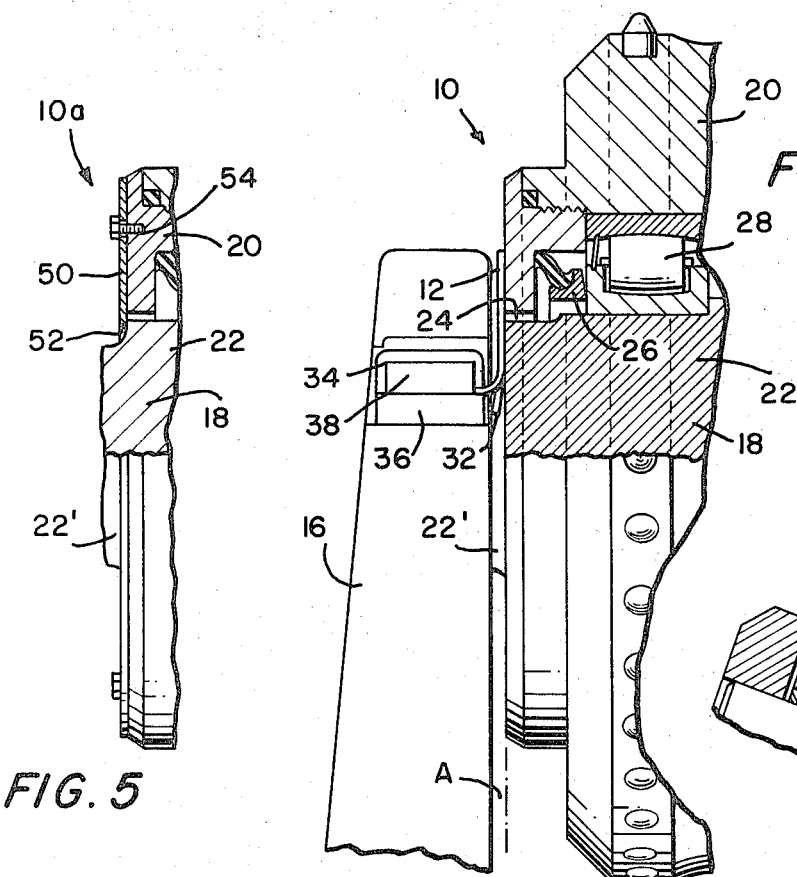
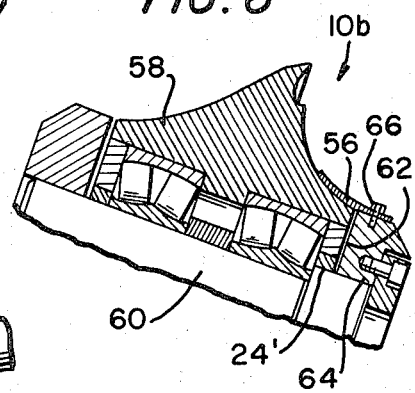

SHIELDING MEANS

This invention pertains to means for shielding seals and bearings, within rotatable earth cutters, for instance, against the entry of fluid and particulate matter into a clearance space defined between a rotatable element, such as an earth cutter, and a shaft upon which the latter is mounted. In the prior art it is well known to deploy seals within these clearance spaces to protect the bearings against detritus. However, it has been discovered that the mortality of both seals and bearings can be lessened by means which shield annular clearance spaces against an initial admission of detritus to the bearing seal itself.

It is an object of this invention, then, to set forth, for use with an earth cutter rotatably carried on a bracket-supported fixed shaft, means for shielding an annular clearance space, defined between the earth cutter and the shaft, against the entry of detritus, comprising: a plate for covering at least a sector of an outermost portion of the clearance space and for engaging an external portion of at least the cutter, which external portion is most adjacent to the clearance space; and means projecting from said plate, for mounting of said plate to the fixed shaft support bracket.

It is another object of this invention to teach, in combination with an earth cutter rotatably carried on a bracket-supported fixed shaft, means for shielding an annular clearance space, defined between the earth cutter and the shaft, against the entry of detritus, comprising: a plate covering at least a sector of an outermost portion of the clearance space, and engaging an external portion of at least the cutter, which external portion is most adjacent to the clearance space; and means projecting from said plate, mounting said plate to the fixed shaft support bracket.

A feature of this invention comprises a flat plate having a mounting limb carried at substantially a right angle, for mounting thereof to a shaft support so that the plate will close upon an axial end of an earth cutter rotatably carried on the shaft. Thus, a clearance space defined between the earth cutter and the shaft is shielded against the entry of dust, rock chips, mud, water and such detritus. The shielding means is designed to prolong the life of bearing seals, and bearings as well, especially where such are in earth cutter use.

Further objects and features of this invention will become more apparent by reference to the following description taken in conjunction with the accompanying figures in which:

FIG. 1 is a side elevational view, according to one embodiment thereof, of the novel shielding means;

FIG. 2 is a plan view of the shielding means of FIG. 1;

FIG. 3 is an end view of the shielding means of FIGS. 1 and 2, taken from the right-hand side of FIG. 1;

FIG. 4 is a fragmentary view of an earth cutter assembly showing but one of two shaft mounting brackets, and an earth cutter and shaft partly in section, with the novel shielding means deployed therewith.

FIG. 5 is a view similar to that of FIG. 4, depicting the same cutter and shaft, but with the one mounting bracket and shaft end removed, showing an alternate embodiment of the novel shielding means; and FIG. 6 is a fragmentary view of yet another earth cutter, shaft and mounting bracket assembly, the cutter and brackets being in section, showing a further embodiment of the invention in use therewith.

As shown in the figures, the shielding means 10 comprises a plate 12 having a limb 14 projecting therefrom at substantially a right angle. The limb and plate are in fact, angularly disposed more than 90° therebetween. The requisite angularity "Z" (FIG. 3) will be dictated by the spacial distance obtaining at "A" (FIG. 4) between the inner surface of a given shaft bracket 16 and the axial end of a cutter assembly 18. The angularity "Z", in any event must be obtuse to insure that, when the limb 14 is mounted to the shaft bracket 16, the plate 12 will be resiliently held against portions of the earth cutter 20 and shaft 22 which are most adjacent to the clearance space 24 defined between the earth cutter and the shaft. This clearance space, shown greatly exaggerated for purposes of clarity, is closed by the superimposition of the plate 12.

The cutter 20, in this embodiment, is normally rotated in the direction indicated by the arrow in FIG. 1 With each rotary cycle, it carried up adhering dust, rock chips, fluid and the like which fall or are drained therefrom over the axial ends of the cutter 20. This detritus would migrate into the clearance space 24 to test and seal 26 and endanger the bearing 28.

According to the invention, the plate 12 closes off the clearance space 24 and, additionally, the cantilevered or depending end 30 of the plate serves as a scraper to clean the axial end of the rotating cutter 20 of any particulate or fluid matter.

The depending end 30 of the plate 12 has a small tang 32 deflected therefrom for resiliently engaging an inner surface of the cutter support 16. This causes the depending end 30 to be held in constant contact with the axial-end surfaces of both the shaft 18 and the cutter 20.

As shown in FIGS. 2 and 4 the limb 14 is apertured to receive a mounting bolt 34 which is used, primarily (from what is well known in the art), to secure the cap 36 upon a type of trunnion mounting for the shaft 18. However, the limb 14 in being apertured for receiving the mounting bolt 34 for the trunnion cap 36 serves to mount the shielding means 10. A projecting tab 38 (shown flat, in FIG. 2) is deflected (FIG. 4) to engage flats of the hex head of the mounting bolt 34, to secure the latter against displacement.

In FIG. 1 the dashed lines outline represent the segment of the clearance space 24 which the plate 12 covers, the segment being a part of an outermost portion of the clearance space. The limb 14 defines a mounting plane 40, and the arcuate-form plate 12 describes an arc upon one side of the plane. Tang 32 extends below plane 40 and is angularly deflected from the plane and parallel surfaces 42 and 42' of the plate 12.

The embodiment of the shielding means 10 depicted is formed of mild steel. However, any sufficiently resilient and durable material can be used in fabricating the invention.

Only one of the means 10 has been depicted (and decribed). However, it will be evident that the same, which may be regarded a "left-hand" embodiment, will have a complementary, mirror-image embodiment for use on the not-shown other ("right-hand") axial end of the assembly 18.

An alternate embodiment of the invention, shown in FIG. 5, comprises shielding means 10a which incorporates a plate 50 which is carried by the cutter 20. Plate 50 is an annulus, having a hole 52 formed centrally therein, which is secured to the cutter 20 by fasteners 54. The central hole 52 accommodates the shaft end (22', FIG. 4) therethrough. (Optionally, of course, such a plate could be fastened to the shaft.) Plate 50 has sufficient resilience to accommodate for end play arising between the shaft and cutter.

The further alternate embodiment of shielding means 10b, shown in FIG. 6, comprises an arcuate segment 56 of a cylinder. The segment is a substantially flat plate which is curved to enwrap and cover at least a sector of a clearance space 24' obtaining between the cutter 58 and shaft 60, as well as such a similar space 62 defined between the cutter bracket 64 and cutter. Only one such segment 56 is shown; ideally, a pair thereof should be used—at opposite ends of the cutter 58. Segment 56 is shown fixed to the right-hand bracket 64; again, optionally, the fasteners 66 could be received by the cutter 58 for mounting of the segment thereto. Segment 56, like plate 50 (FIG. 5) and plate 12 (FIGS. 1–4) is resilient.

While I have described my invention in connection with specific embodiments thereof, it is to be clearly understood that this is done only by way of example and not as a limitation to the scope of my invention as set forth in the objects thereof and in the appended claims.

I claim:

1. For use with an earth cutter rotatably carried on a bracket-supported fixed shaft, means for shielding an annular clearance space, defined between the earth cutter and the shaft, against the entry of detritus, comprising:
   a plate for covering at least a sector of an outermost portion of the clearance space, and for engaging an external portion of at least the cutter, which external portion is most adjacent to the clearance space; and
   means projecting from said plate, for mounting of said plate to the fixed shaft support bracket; wherein
   said mounting means comprises an apertured mounting limb for receiving a fastener;
   said plate is defined by a pair of plane and parallel surfaces;
   said apertured mounting limb projects angularly from one side of said plate; and
   said apertured mounting limb and said one side define an obtuse angle therebetween.

2. For use with an earth cutter carried on a bracket-supported shaft, means for shielding an annular clearance space, defined between the earth cutter and the shaft, against the entry of detritus, comprising:
   a plate for covering at least a sector of an outermost portion of the clearance space, and for engaging an external portion of at least the cutter, which external portion is most adjacent to the clearance space; and
   means projecting from said plate, for mounting of said plate to the shaft support bracket; wherein
   said mounting means comprises an apertured mounting limb for receiving a fastener;
   said apertured mounting limb is flat, defining a linear mounting plane; and
   said plate described an arc which is substantially perpendicular to an end of said mounting plane.

3. For use with an earth cutter carried on a bracket-supported shaft, means for shielding an annular clearance space, defined between the earth cutter and the shaft, against the entry of detritus, comprising:
   a plate for covering at least a sector of an outermost portion of the clearance space, and for engaging an external portion of at least the cutter, which external portion is most adjacent to the clearance space; and
   means projecting from said plate, for mounting of said plate to the shaft support bracket; wherein
   said mounting means comprises an apertured mounting limb for receiving a fastener; and
   said apertured mounting limb has a tab, contiguous therewith disposed along, and deformable from, said mounting plane for lockingly engaging any such fastener received by the apertured mounting limb aperture.

4. For use with an earth cutter rotatably carried on a bracket-supported fixed shaft, means for shielding an annular clearance space, defined between the earth cutter and the shaft, against the entry of detritus, comprising:
   a plate for covering at least a sector of an outermost portion of the clearance space, and for engaging an external portion of at least the cutter, which external portion is most adjacent to the clearance space; and
   means projecting from said plate, for mounting of said plate to the fixed shaft support bracket; wherein
   said mounting means comprises an apertured mounting limb for receiving a fastener;
   said plate is substantially elongated; and said apertured mounting limb projects from one end thereof.

5. Shielding means, according to claim 4, further including:
   means disposed at an end of said plate opposite said one end for engaging a surface of the support bracket, said latter means being responsive to an engagement thereof with said bracket surface to cause said opposite end of said plate to be resiliently held in engagement with the cutter.

6. Shielding means, according to claim 5, wherein:
   said bracket surface engaging means comprises a tang contiguous with said plate and angularly deflected therefrom.

7. In combination with an earth cutter rotatably carried on a bracket-supported fixed shaft, means for shielding an annular clearance space, defined between the earth cutter and the shaft, against the entry of detritus, comprising:
   a plate covering at least a sector of an outermost portion of the clearance space, and engaging an external portion of at least the cutter, which external portion is most adjacent to the clearance space; and
   means projecting from said plate, mounting said plate to the fixed shaft support bracket; wherein
   said mounting means comprises an apertured mounting limb, and a fastener securing said apertured mounting limb to said bracket.

8. Shielding means, according to claim 7, wherein: said plate is arcuate in form.

9. Shielding means, according to claim 7, wherein:

said apertured mounting limb has a tab, contiguous therewith and deformed from said mounting plane, lockingly engaging said fastener.

10. Shielding means, according to claim 7, wherein:

said plate is defined by a pair of plane and parallel surfaces; and said apertured mounting limb projects angularly from one side of said plate.

11. Shielding means, according to claim 10, wherein:

said apertured mounting limb is flat, defining a linear mounting plane; and
said plate describes an arc which is substantially perpendicular to an end of said mounting plane.

12. Shielding means, according to claim 10, wherein:

said apertured mounting limb and said one side define an obtuse angle therebetween.

13. Shielding means, according to claim 7, wherein:

said plate is substantially elongated; and said apertured mounting limb projects from one end thereof.

14. Shielding means, according to claim 13, further including;

means disposed at an end of said plate opposite said one end in engagement with a surface of the support bracket and, responsive to said engagement thereof with said bracket surface, causing said opposite end of said plate to be resiliently held in engagement with the cutter.

15. Shielding means, according to claim 14, wherein:

said bracket surface engaging means comprises a tang contiguous with said plate and angularly deflected therefrom.

* * * * *